United States Patent
Iwata et al.

(10) Patent No.: US 8,833,495 B2
(45) Date of Patent: Sep. 16, 2014

(54) SADDLE-RIDE TYPE ELECTRIC VEHICLE

(75) Inventors: Kobue Iwata, Wako (JP); Hisafumi Shako, Wako (JP); Toshifumi Sekimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/277,488

(22) Filed: Oct. 20, 2011

(65) Prior Publication Data

US 2012/0097463 A1 Apr. 26, 2012

(30) Foreign Application Priority Data

Oct. 25, 2010 (JP) .................................. 2010-239070

(51) Int. Cl.
*B62M 7/06* (2006.01)
*B62J 6/00* (2006.01)
*B60K 1/00* (2006.01)
*B60K 1/04* (2006.01)

(52) U.S. Cl.
CPC ... *B60K 1/00* (2013.01); *B62J 6/00* (2013.01); *B60L 2200/24* (2013.01); *B60Y 2200/12* (2013.01); *B62M 7/06* (2013.01); *B60Y 2400/61* (2013.01); *B60K 1/04* (2013.01)
USPC ....... 180/65.1; 180/68.5; 180/207.3; 320/107

(58) Field of Classification Search
None
See application file for complete search history.

(56) References Cited

U.S. PATENT DOCUMENTS

| | | | |
|---|---|---|---|
| 3,966,007 A * | 6/1976 | Havener et al. | 180/220 |
| 5,924,511 A * | 7/1999 | Takata | 180/206.2 |
| 6,357,542 B1 * | 3/2002 | Sako | 180/68.5 |
| 2002/0027026 A1 * | 3/2002 | Hong | 180/65.2 |
| 2007/0096452 A1 * | 5/2007 | Iwasaki | 280/833 |
| 2007/0231626 A1 * | 10/2007 | Kurosawa | 429/13 |
| 2008/0006463 A1 * | 1/2008 | Oohashi | 180/219 |
| 2008/0078602 A1 * | 4/2008 | Igarashi et al. | 180/227 |
| 2008/0211250 A1 * | 9/2008 | Yano et al. | 296/37.1 |
| 2009/0206583 A1 * | 8/2009 | Misaki et al. | 280/730.1 |
| 2010/0078249 A1 * | 4/2010 | Nishiura et al. | 180/220 |

FOREIGN PATENT DOCUMENTS

JP 06-156002 6/1994

* cited by examiner

*Primary Examiner* — J. Allen Shriver, II
*Assistant Examiner* — Hilary L Johns
(74) *Attorney, Agent, or Firm* — Rankin, Hill & Clark LLP

(57) ABSTRACT

A two-wheeled electric vehicle includes a main frame extending rearward and downward from a head pipe, a swing arm swingably supported by a rear portion of the main frame, and an electric motor serving as a drive source. In the two-wheeled electric vehicle, a battery unit for supplying electric power to the electric motor is disposed above the main frame, and a PDU for performing drive control of the electric motor is disposed below the main frame.

20 Claims, 6 Drawing Sheets

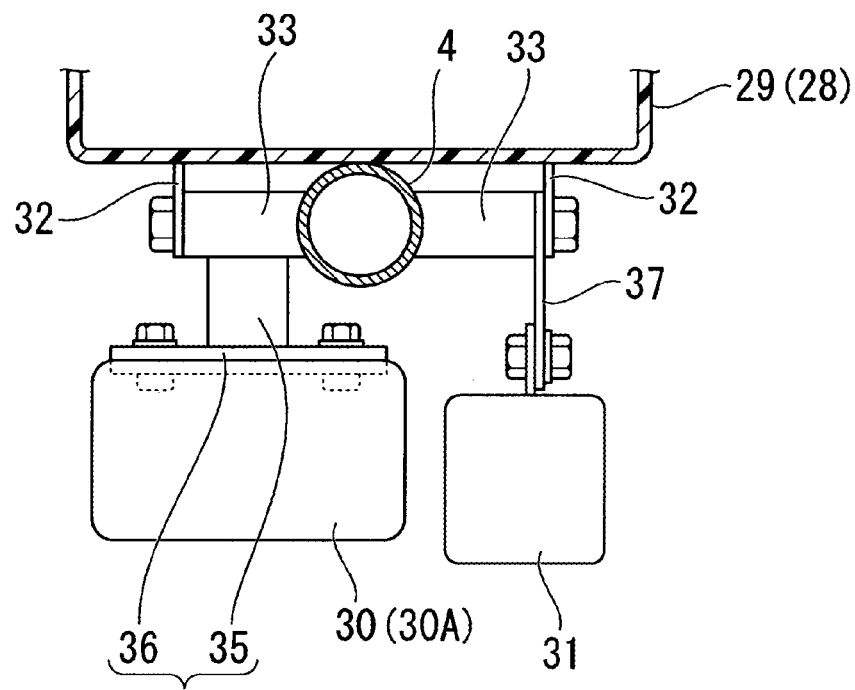
FIG. 5
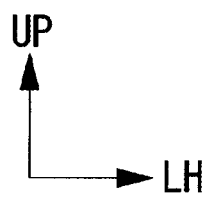

SADDLE-RIDE TYPE ELECTRIC VEHICLE

BACKGROUND OF THE INVENTION

1. Field of the Invention

The present invention relates to a saddle-ride type electric vehicle.

2. Description of Related Art

Recently, there has been proposed various techniques related to saddle-ride type electric vehicles. For example, JP-A No. H06-156002 discloses a vehicle in which a battery and the like are disposed between a main frame, which extends horizontally from a head pipe, and a down frame, which extends rearward and downward from the head pipe.

Saddle-ride type electric vehicles have different frame forms depending on the type of vehicle. Specifically, examples of the frame forms include: a frame form such as is disclosed in the above-described JP-A No. H06-156002; a frame form for low-floor vehicles in which a frame extends rearward and downward from a head pipe to extend substantially horizontally rearward; and, a frame form for sports utility vehicles in which a frame extends rearward and downward from a head pipe and supports a swing arm at a rear portion thereof.

A good layout of various components for cool performance for a battery or the like has been demanded of such saddle-ride type electric vehicles. However, what qualifies as a good layout varies depending on the particular types of saddle-ride type electric vehicles, as each vehicle type has a different frame form.

SUMMARY OF THE INVENTION

Accordingly, the present invention has been made in view of such circumstances, and is directed toward providing a saddle-ride type electric vehicle including a body frame in which a head pipe and a swing arm pivot are connected by a single frame, and in which various components are suitably disposed, thereby achieving good cooling performance for electric system components.

As a solution to the above-described problem, the present invention provides a saddle-ride type electric vehicle including a main frame extending rearward and downward from a head pipe, a swing arm swingably supported by a rear portion of the main frame, and an electric motor serving as a drive source, in which: a battery for supplying electric power to the electric motor is disposed above the main frame; and a driver for performing drive control of the electric motor is disposed below the main frame.

In further accordance with the present invention, the main frame is provided with a retainer for mounting the battery, and the battery is disposed along an extending direction of the main frame. As such, the battery and the driver are disposed at positions where a traveling wind is easy to catch. Thus, the battery and the driver can be effectively cooled by the traveling wind.

In further accordance with the present invention, a pivot plate for supporting the swing arm is provided on a rear portion of the main frame, and the electric motor is fixed to the pivot plate. With this arrangement, the distance of the battery and the driver to the electric motor is reduced, thereby allowing a reduction in the length of a harness that is connected therebetween. Further, the electric motor is disposed in the same engine mount position as a motorcycle equipped with an internal combustion engine. Thus, it is possible to achieve the same traveling performance as a motorcycle equipped with an internal combustion engine. In addition, the layout of the drive source is the same as that of the internal combustion engine, thereby allowing an increase in the number of appropriable components between these different vehicles.

In further accordance with the present invention, the battery is stored in a battery case supported above the main frame. The battery case is openably closed from above by a lid member, and the lid member is openably and closably covered with a body cover. Also, a storage space is formed by the lid member and the body cover. With this arrangement, it is possible to unify the lid (the lid member) for battery maintenance and the storage space and to improve maintainability. Also, a portion corresponding to a fuel tank of a motorcycle equipped with an internal combustion engine may be used as a storage box.

In further accordance with the present invention, an electrical component box for storing electrical components is disposed in a rear of the battery. This makes it possible to efficiently cool the battery and the electrical components with the traveling wind flowing in a vehicle longitudinal direction.

Also, an upper portion of the electrical component box supports a front portion of a seat where an occupant sits. This configuration makes it possible to simplify the frame and attain low weight.

BRIEF DESCRIPTION OF THE DRAWINGS

These and further features of the invention will be apparent with reference to the following description and drawings, in which:

FIG. 5 is a view in the direction of arrow A in FIG. 4; and,

DETAILED DESCRIPTION OF THE PREFERRED EMBODIMENTS

Figure 1:
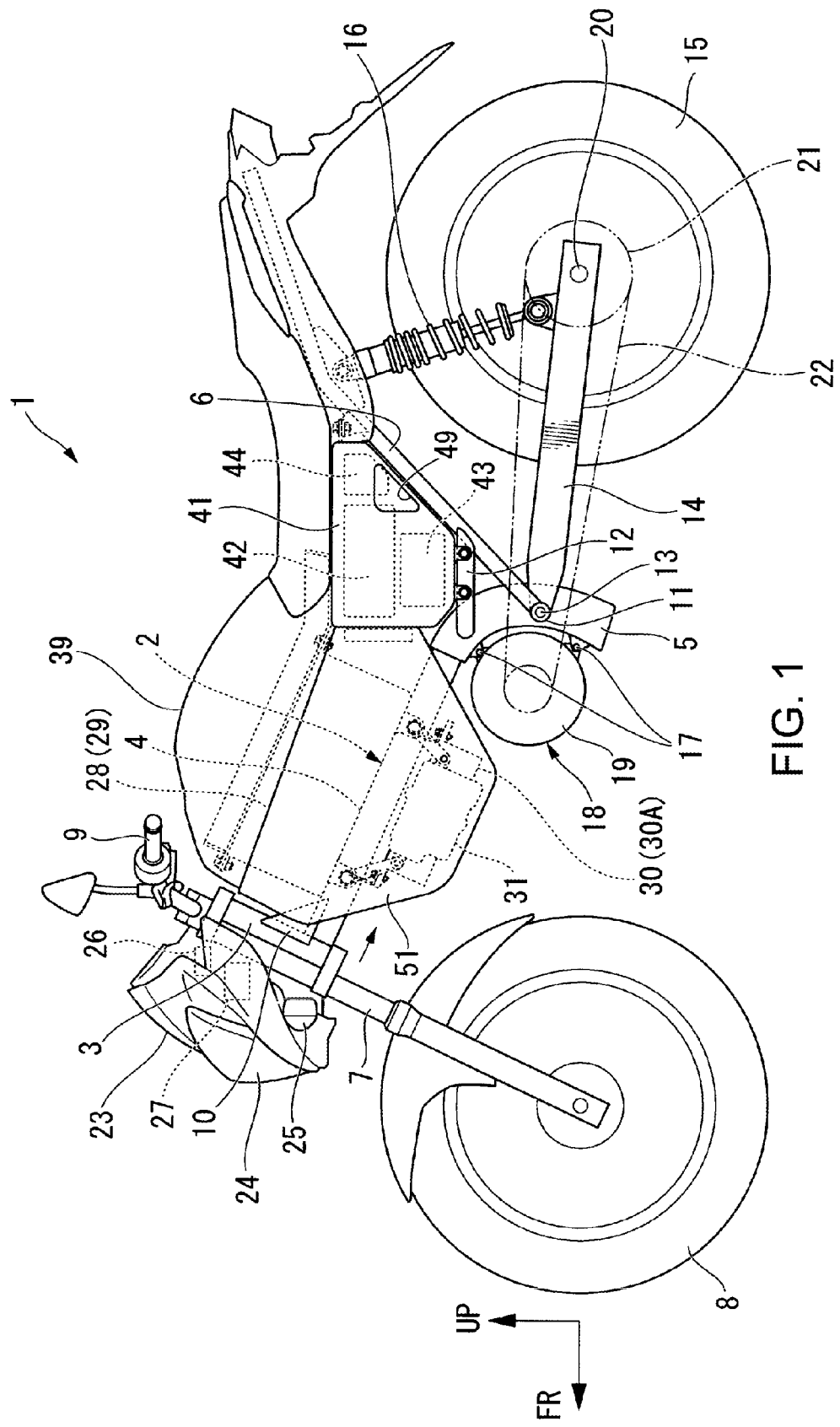
FIG. 1 is a left side view of a two-wheeled electric vehicle according to an embodiment of the present invention.

Hereinafter, an embodiment of the present invention will be described with reference to the accompanying drawings. It should be noted that, in the drawings used in the following description, arrow FR indicates the front of a vehicle, arrow UP indicates the upper side of the vehicle, and arrow LH indicates the left of the vehicle.

FIG. 1 shows a two-wheeled electric vehicle 1 as an example of a saddle-ride type electric vehicle according to this embodiment. The two-wheeled electric vehicle 1 includes a body frame 2 made of steel in which plural frame members are integrally formed by welding or the like. The body frame 2 includes: a head pipe 3; a main frame 4 extending rearward and downward from the head pipe 3; a pivot plate 5 welded to a rear end of the main frame 4; and a pair of rear frames 6 coupled to the pivot plate 5 and extending rearward and upward. A pair of front forks 7 is rotatably supported by the head pipe 3. A front wheel 8 is rotatably supported by lower portions of the front forks 7. A steering handlebar 9 is fixed to an upper portion of the front forks 7. Various operating devices (not shown), such as an accelerator grip and a brake lever, are disposed on the steering handlebar 9.

Figure 2:
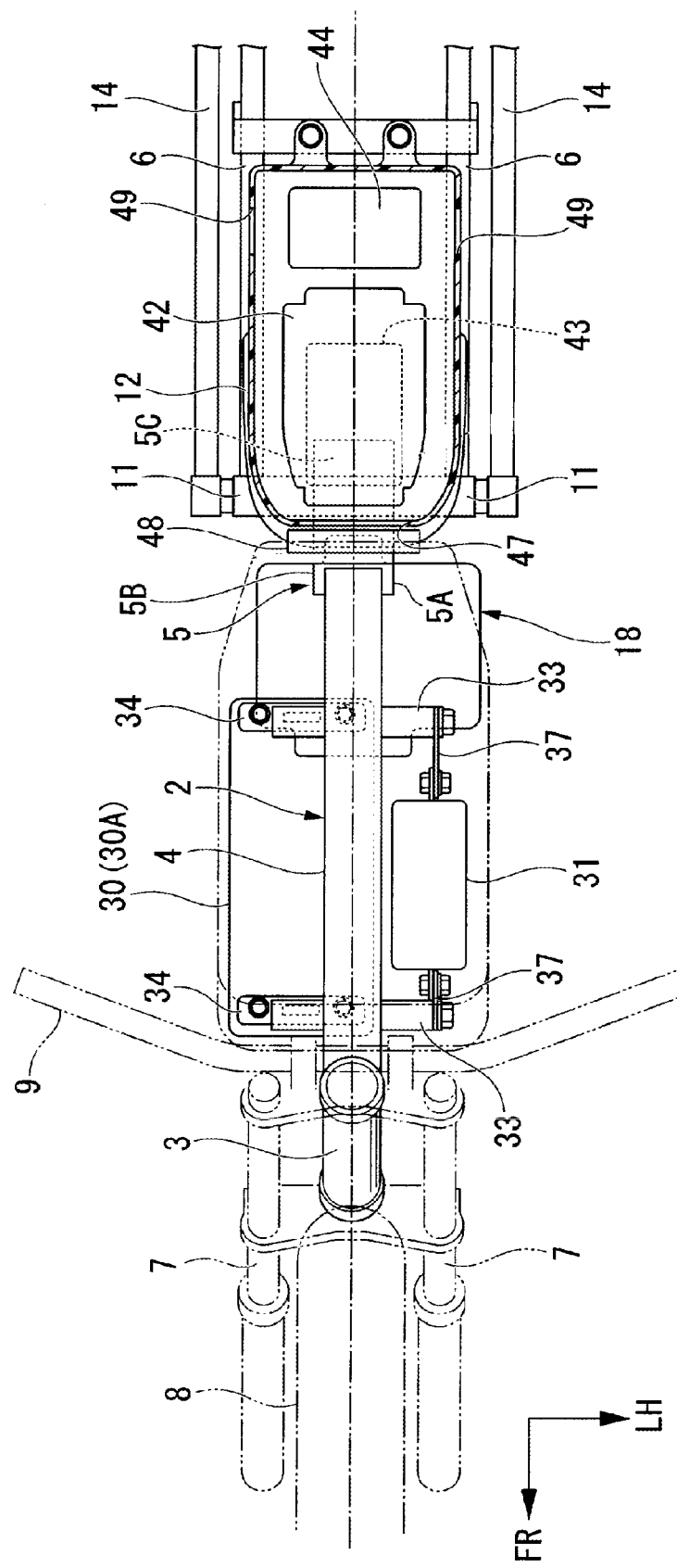
FIG. 2 is a top plan view of the two-wheeled electric vehicle.
Figure 3:
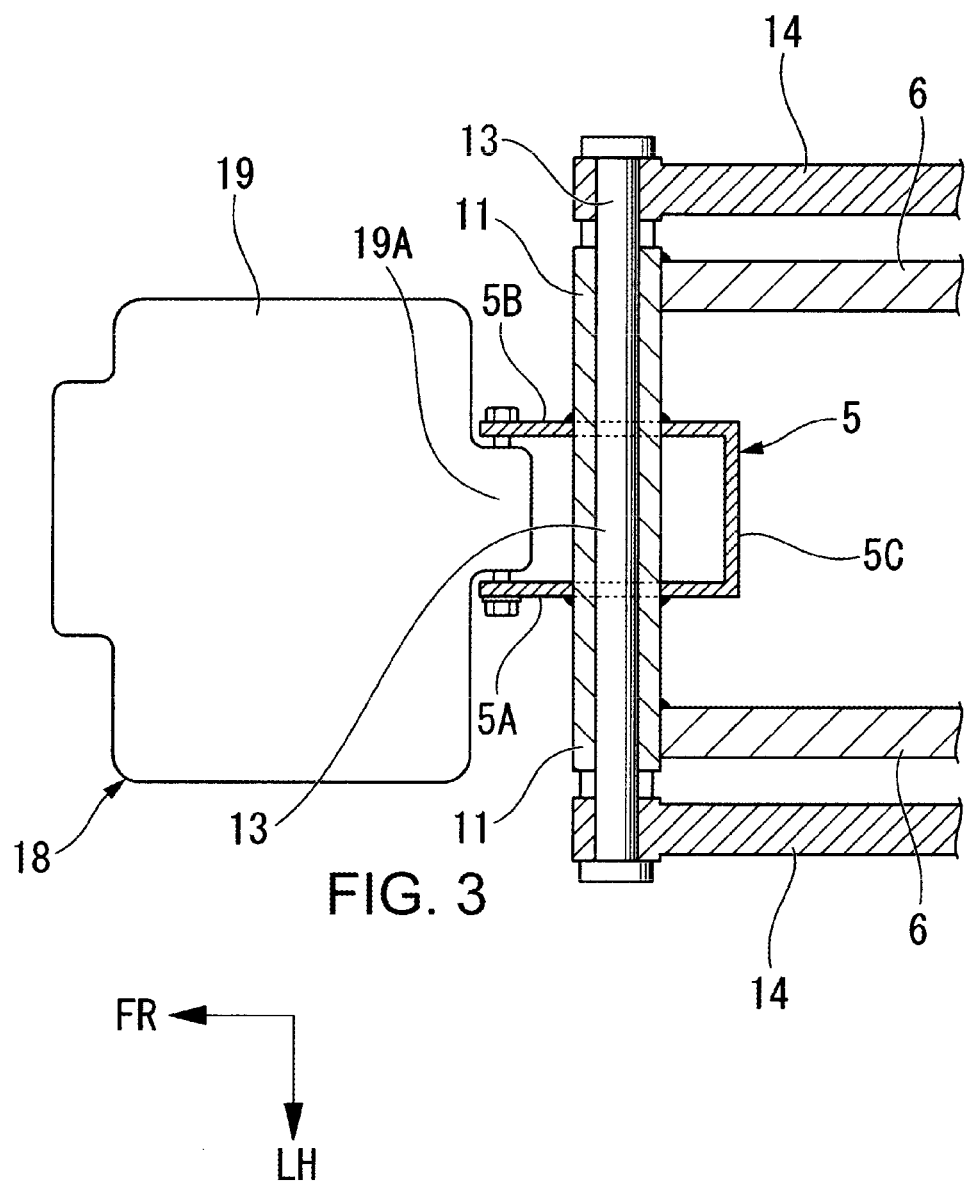
FIG. 3 is a cross-sectional view of the periphery of a pivot plate of the two-wheeled electric vehicle.

A pair of gusset plates 10, each of which are triangle-shaped in side view, are each welded in straddle fashion to the head pipe 3 and a front portion of the main frame 4 to reinforce the coupling portion therebetween. Referring also to FIGS. 2 and 3, the pivot plate 5 includes a left wall 5A and a right wall 5B which are vertically long in side view, and a rear wall 5C that connects rear portions of the left wall 5A and the right wall 5B. The pivot plate 5 is formed into a U-shape in cross section with a front opening. At an upper portion of the pivot plate 5, a rear end of the main frame 4 is coupled to the pivot plate 5 so as to be sandwiched between the left wall 5A and the right wall 5B. The left wall 5A and the right wall 5B are arc-shaped in side view. Circular bosses 11 protruding outward in a vehicle width direction are integrally formed in vertically substantially central areas of the left wall 5A and the right wall 5B. Respective front ends of the rear frames 6 are welded and coupled to outer peripheral surfaces of the bosses 11.

As shown in FIGS. 1 and 2, the rear frames 6 are mutually coupled by a cross frame 12. The cross frame 12 is formed into a U-shape in top view. The cross frame 12 penetrates the pivot plate 5, and extends rearward to be welded and coupled at its both ends to the rear frames 6. As shown in FIG. 3, a pivot shaft 13, serving as a swing arm pivot, is inserted through the bosses 11 of the pivot plate 5. Left and right swing arms 14 are supported in a vertically swingable manner by the pivot shaft 13.

A rear wheel 15 is rotatably supported by rear portions of the swing arms 14. Left and right rear cushions 16 are interposed between the swing arms 14 and longitudinally substantially central areas of the rear frames 6. As shown in FIG. 1, stays 17 protruding forward are provided on each of the left wall 5A and the right wall 5B of the pivot plate 5. An electric motor 18 is supported by these stays 17. The electric motor 18 includes a housing 19 that is circular in side view. As shown in FIG. 3, brackets 19A formed on the housing 19 and protruding radially outwardly are fastened to the respective stays 17, thereby supporting the electric motor 18. As shown in FIG. 1, the housing 19 conforms to front arc faces of the left wall 5A and the right wall 5B. In other words, the left wall 5A and the right wall 5B are formed into arcs in side view so as to conform to the electric motor 18.

The electric motor 18 includes a drive shaft (not shown), and a drive gear fixed to the drive shaft. A driven gear 21 is provided on an axle 20 for journaling the rear wheel 15 to the swing arms 14. A transmission chain 22 is wound around the above-described drive gear and the driven gear 21. The transmission chain 22 transmits power from the electric motor 18 to the rear wheel 15. A front cover 23 made of resin is disposed in front of the head pipe 3. A headlight 24, a turn signal 25, and various meters are supported by the front cover 23. Also, an acceleration sensor 26 and a loudspeaker 27 are disposed inside the front cover 23. An output of the electric motor 18 is controlled according to the operation of the acceleration sensor 26. The loudspeaker 27 is configured to permit output of a warning beep or the like.

Figure 4:
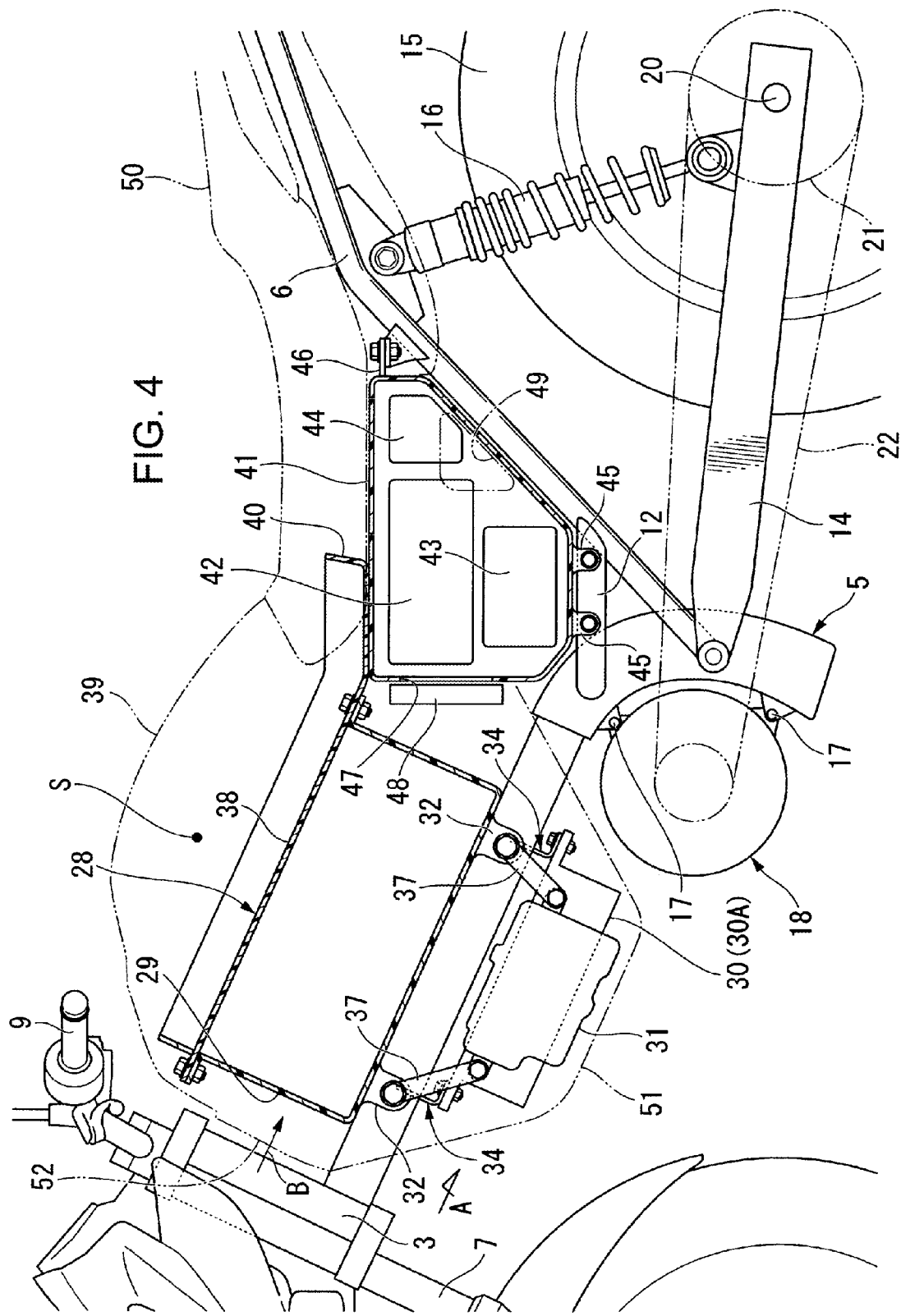
FIG. 4 is a left side view of the essential parts of the two-wheeled electric vehicle.

The electric motor 18 receives power supply from a battery unit 28. Above the main frame 4, as shown in FIG. 4, the battery unit 28 is stored and supported in a battery case 29. Also, below the main frame 4, there are supported a PDU (Power Drive Unit) 30 in which an ECU (Electrical Control Unit) 30A for performing centralized control of various processing in the vehicle is integrated, and a contactor 31. The PDU 30 performs drive control of the electric motor 18 according to directions from the ECU 30A. The contactor 31 is connected to the battery unit 28 and is also connected to the PDU 30 and a DC-DC converter 43, described hereinafter.

The contactor 31 includes a relay circuit to supply power from the battery unit 28 to the PDU 30 and the DC-DC converter 43.

The battery case 29 is an upwardly-open box body made of a resin material and integrally includes, at its bottom, mounting pieces 32 protruding downward and each having a bolt insertion hole at its leading end. As shown in FIG. 5, cylindrical mounting stays 33 protruding outward in the vehicle width direction are welded to the main frame 4. These mounting stays 33 are arranged in pairs of front and rear, with one pair for each side surface of the main frame 4. The battery case 29 is fastened with the mounting pieces 32 aligned with respective leading ends of the mounting stays 33 of the main frame 4. The battery case 29 is supported, in its longitudinal direction, along an extending direction of the main frame 4. The battery unit 28 stored in the battery case 29 is constructed to include plural lithium ion batteries. These batteries are connected in series to compose a high-voltage battery.

As shown in FIGS. 4 and 5, PDU brackets 34 are welded in a hanging manner to the respective mounting stays 33 located on the right side of the main frame 4. The PDU brackets 34 each include: a base 35 that is welded so as to hang from the mounting stay 33; and a stay 36 that is bent to extend in the vehicle width direction from the base 35 and has retaining points set on both ends thereof. The PDU 30 is supported by the main frame 4, with a box body of the PDU 30 fastened to the stay 36.

Contactor brackets 37, which are rectangular plates, are fixed to the respective mounting stays 33 located on the left side of the main frame 4, along with the respective mounting pieces 32 of the battery case 29. Bolt insertion holes are formed in lower ends of the contactor brackets 37. The contactor 31 is supported by the main frame 4, with a box body of the contactor 31 fastened to the contactor brackets 37. It should be noted that the battery unit 28, the PDU 30, and the contactor 31 are electrically connected by a cable (not shown).

As shown in FIG. 4, the battery case 29 is openably and closably covered from above with a lid 38 made of a resin material. The lid 38 is openably and closably covered from above with a body cover 39 formed in imitation of an internal-combustion fuel tank (see also FIG. 1). A closed space is formed by the lid 38 and the body cover 39. This space is utilized as a storage space S. A guard wall 40 is formed in an upright posture on a peripheral edge of the lid 38. The lid 38 can carry articles on an upper surface thereof, and the guard wall 40 prevents the articles from dropping off.

An electrical component box 41 is disposed in the rear of the battery case 29 in such a way as to be placed on the cross frame 12. The electrical component box 41 is made of a resin material. A battery charger (a charger) 42, the DC-DC converter 43, and a sub-battery 44 are stored in the electrical component box 41. The battery charger 42 includes a charging outlet (not shown) to enable external power to be stored in the battery unit 28. The DC-DC converter 43 lowers the voltage from the battery unit 28 to supply electric power to the ECU 30A in the PDU 30 or the like. The sub-battery 44 is connected to the ECU 30A integral with the PDU 30, the contactor 31 and the like by a cable (not shown). Also, before startup of the battery unit 28, the sub-battery 44 supplies electric power to the ECU 30A, the contactor 31 and the like to activate the same.

The electrical component box 41 is fixed to the cross frame 12 by bottom mounting pieces 45 integrally formed at a bottom thereof, and also fixed to the rear frames 6 by rear mounting pieces 46 integrally formed at a rear thereof. An intake port 47 with a front opening is formed in front of the electrical component box 41. A cooling fan 48 for intake of air into the electrical component box 41 is fixed in front of the intake port 47. Also, laterally opening left and right exhaust ports 49 are formed on both sides in the rear of the electrical component box 41 to let out of the electrical component box 41.

The electrical component box 41 supports at its upper portion a front portion of a seat 50 where an occupant sits. The seat 50 is disposed above the rear frames 6 and fixed in straddle fashion on the electrical component box 41 and the rear frames 6. The seat 50 is removably mounted. An upper portion of the electrical component box 41 is exposed by removing the seat 50.

Furthermore, the battery unit 28 (the battery case 29), the PDU 30, and the contactor 31 are laterally covered with a body side cover 51 made of a resin material (see also FIG. 1). An intake port 52 with a front opening is formed in front of the body side cover 51. A traveling wind flowing in the direction of arrow B in the figure is taken in through the intake port 52 to cool the battery unit 28. The traveling wind passing through the battery unit 28 flows rearward in a straight line to be breathed into the electrical component box 41 by the cooling fan 48.

Figure 6:
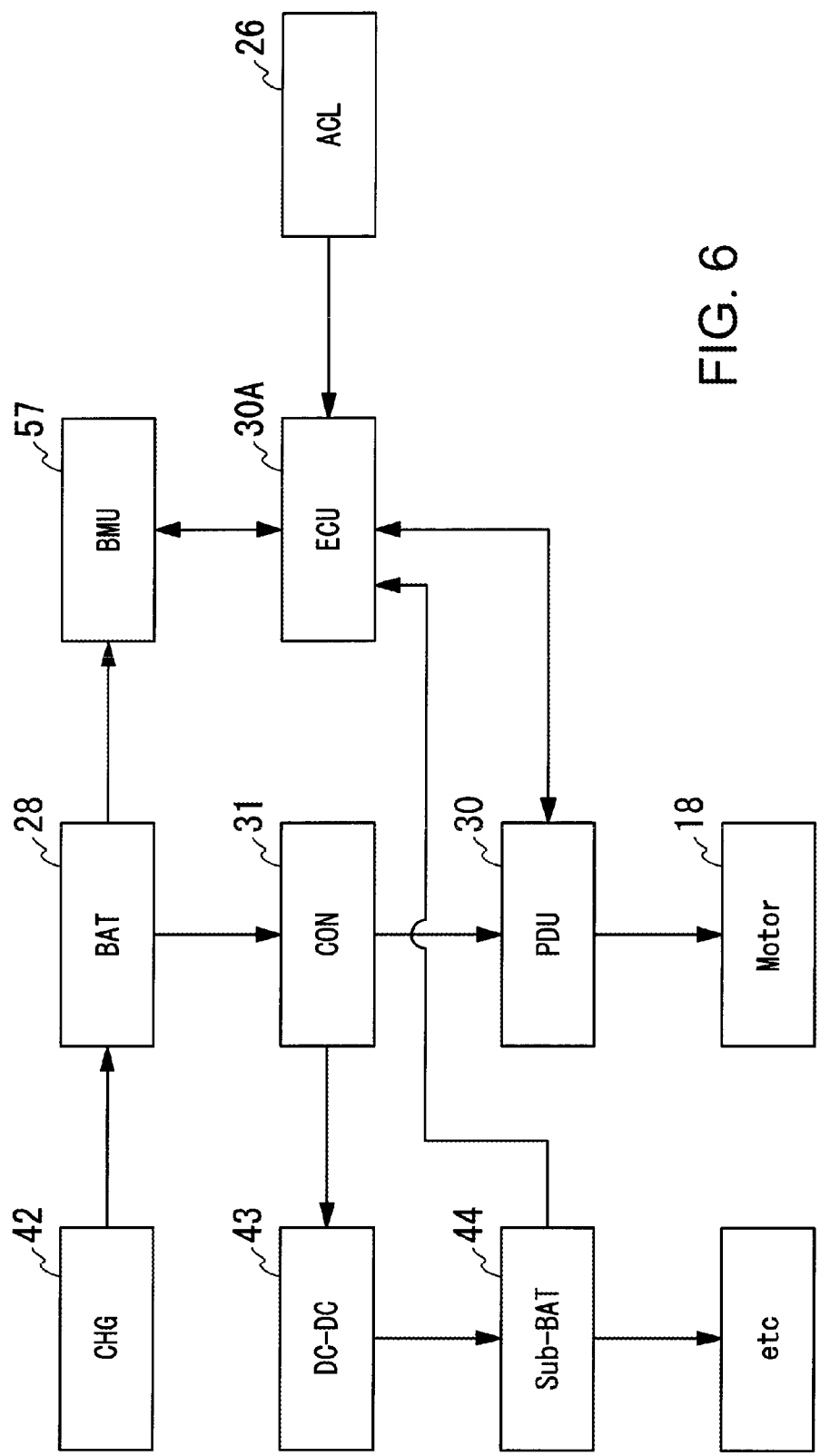
FIG. 6 is a block diagram illustrating the system configuration of the two-wheeled electric vehicle.

FIG. 6 illustrates the system configuration of the two-wheeled electric vehicle 1. As shown in FIG. 6, in the two-wheeled electric vehicle 1, electric power from the battery unit 28 is supplied to the PDU 30 serving as a motor driver through the contactor 31 working with a main switch not shown. After the conversion of DC into three-phase AC in the PDU 30, the power is supplied to the electric motor 18 that is a three-phase AC motor. Also, the output voltage from the battery unit 28 is lowered through the DC-DC converter 43 to be supplied to common electrical components ("etc" in the figure) such as the sub-battery 44 of 12 V and meters, and control system components such as the ECU 30A.

The battery unit 28 is charged by the battery charger (CHG) 42 connected to, for example, a power source of AC 100 V. A BMU (Battery Management Unit) 57 monitors the charge-discharge state, temperature, etc. of the battery unit 28, and such information is shared with the ECU 30A. Output request information from the acceleration sensor 26 is input to the ECU 30A. Based on this output request information, the ECU 30A performs drive control of the electric motor 18 through the PDU 30. It should be noted that, although the battery charger 42 is provided in a proper place on a vehicle body, the arrangement may be such that the battery charger 42 is not mounted. It should be also noted that, according to the type of the battery unit 28, the structure may be such that the sub-battery 44 is removed. Furthermore, the BMU 57 is disposed close to the battery unit 28.

In this two-wheeled electric vehicle 1, an accelerator grip (not shown) is provided on the steering handlebar 9. An accelerator opening degree of the accelerator grip is detected by the acceleration sensor 26 to be output to the ECU 30A. The ECU 30A controls the PDU 30 according to an accelerator opening degree. The rear wheel 15 is driven by the PDU 30 so as to allow the two-wheeled electric vehicle 1 to travel.

As described above, in the two-wheeled electric vehicle 1 according to this embodiment, the battery unit 28 for supplying electric power to the electric motor 18 is disposed above the main frame 4. Also, the PDU 30 for performing drive control of the electric motor 18 is disposed below the main frame 4. With this structure, in the two-wheeled electric vehicle 1, it is possible to effectively cool the battery unit 28, the PDU 30 and the like by the traveling wind.

Also, in this two-wheeled electric vehicle 1, the pivot plate 5 for supporting the swing arm 14 is provided on the rear portion of the main frame 4, and the electric motor 18 is fixed to the pivot plate 5. This structure allows a reduction in the distance of the battery unit 28, the PDU 30, the contactor 31, etc. to the electric motor 18, thereby allowing a reduction in the length of a harness to be connected therebetween. Further, the electric motor is disposed in the same engine mount position as a motorcycle equipped with an internal combustion engine. Thus, it is possible to achieve the same traveling performance as a motorcycle equipped with an internal combustion engine. In addition, the layout of the drive source is the same as that of the internal combustion engine, thereby allowing an increase in the number of the appropriable components between these different vehicles.

Moreover, in the above-described two-wheeled electric vehicle 1, the battery unit 28 is stored in the battery case 29 supported above the main frame 4. Also, the battery case 29 is openably closed from above by the lid 38, and the lid 38 is openably and closably covered with the body cover 39. The storage space S is formed by the lid 38 and the body cover 39. This structure allows unification of the lid 38 for battery maintenance and the storage space, and an improvement in maintainability. Also, a fuel tank portion of a motorcycle equipped with an internal combustion engine can be used as a storage box.

Additionally, the electrical component box 41 for storing electrical components is disposed in the rear of the battery unit 28. It is therefore possible to efficiently cool the battery unit 28 and the electrical components (the battery charger 42, the DC-DC converter 43, and the sub-battery 44) with the traveling wind flowing in a vehicle longitudinal direction. Also, the electrical component box 41 supports at its upper portion a front portion of the seat 50 where an occupant sits, thereby simplifying the frame and attaining low weight.

While the above is a description of the embodiment of the present invention, the present invention is not limited to the above-described embodiment. For example, in the above-described embodiment, the batter unit is constructed to include plural lithium ion batteries, however, alternatively, nickel-metal-hydride batteries or lead-acid batteries may be employed.

REFERENCE NUMBERS

1 . . . Two-wheeled electric vehicle
3 . . . Head pipe
4 . . . Main frame
14 . . . Swing arm
18 . . . Electric motor
28 . . . Battery unit (battery)
29 . . . Battery case
30 . . . PDU (Driver)
38 . . . Lid (lid member)
39 . . . Body cover
41 . . . Electrical component box
50 . . . Seat

What is claimed is:
1. A saddle-ride type electric vehicle comprising:
a main frame extending rearward and downward from a head pipe, said main frame including a pair of mounting stays, said pair of mounting stays being affixed to the main frame and extending from the main frame in a vehicle width direction;
a swing arm swingably supported by a rear portion of the main frame; and
an electric motor serving as a drive source,
wherein: a battery that supplies electric power to the electric motor is received in a battery case, said battery case being mounted to both of said pair of mounting stays and being disposed above the main frame;

a driver that performs drive control of the electric motor, said driver being mounted to one of said pair of mounting stays and disposed below the main frame whereby said main frame and pair of mounting stays are interposed between said battery case and said driver;

a contactor, which is electrically connected to the battery and the driver, is disposed laterally of said driver;

wherein said contactor, said driver, and said battery are disposed forwardly of a seat of said saddle-ride type electric vehicle.

2. The saddle-ride type electric vehicle according to claim 1, wherein:

said one of said pair of mounting stays extends away from the main frame in a first direction and an other of said pair of mounting stays extends away from the main frame in a second direction, said second direction being opposite to said first direction, said pair of mounting stays being a first pair of mounting stays, said main frame further including a second pair of mounting stays, said first and second pairs of mounting stays being spaced apart from one another along a length of the main frame; and the battery is mounted to the first and second pairs of mounting stays and is disposed along an extending direction of the main frame.

3. The saddle-ride type electric vehicle according to claim 1, further comprising:

a pivot plate that supports the swing arm is provided on a rear portion of the main frame at a location rearwardly and downwardly spaced from the battery case;

and wherein:

the electric motor is fixed to the pivot plate.

4. The saddle-ride type electric vehicle according to claim 1, wherein:

the battery case is openably closed from above by a lid member, and the lid member is openably and closably covered with a body cover; and a storage space is defined by the lid member and the body cover.

5. The saddle-ride type electric vehicle according to claim 1, wherein an electrical component box that stores electrical components is disposed rearwardly of the battery case.

6. The saddle-ride type electric vehicle according to claim 5, wherein an upper portion of the electrical component box supports a front portion of a seat where an occupant sits.

7. The saddle-ride type electric vehicle according to claim 2, further comprising:

a pivot plate that supports the swing arm is provided on a rear portion of the main frame at a location rearwardly and downwardly spaced from the battery case;

and wherein:

the electric motor is fixed to the pivot plate.

8. The saddle-ride type electric vehicle according to claim 2, wherein:

the battery case is openably closed from above by a lid member, and the lid member is openably and closably covered with a body cover; and a storage space is defined by the lid member and the body cover.

9. The saddle-ride type electric vehicle according to claim 3, wherein:

the battery case is openably closed from above by a lid member, and the lid member is openably and closably covered with a body cover; and a storage space is defined by the lid member and the body cover.

10. The saddle-ride type electric vehicle according to claim 7, wherein:

the battery case is openably closed from above by a lid member, and the lid member is openably and closably covered with a body cover; and a storage space is defined by the lid member and the body cover.

11. The saddle-ride type electric vehicle according to claim 2, wherein an electrical component box that stores electrical components is disposed rearwardly of the battery case.

12. The saddle-ride type electric vehicle according to claim 3, wherein an electrical component box that stores electrical components is disposed rearwardly of the battery case.

13. The saddle-ride type electric vehicle according to claim 4, wherein an electrical component box that stores electrical components is disposed rearwardly of the battery case.

14. The saddle-ride type electric vehicle according to claim 7, wherein an electrical component box that stores electrical components is disposed rearwardly of the battery case.

15. The saddle-ride type electric vehicle according to claim 8, wherein an electrical component box that stores electrical components is disposed rearwardly of the battery case.

16. The saddle-ride type electric vehicle according to claim 9, wherein an electrical component box that stores electrical components is disposed rearwardly of the battery case.

17. The saddle-ride type electric vehicle according to claim 10, wherein an electrical component box that stores electrical components is disposed rearwardly of the battery case.

18. The saddle-ride type electric vehicle according to claim 11, wherein an upper portion of the electrical component box supports a front portion of a seat where an occupant sits.

19. The saddle-ride type electric vehicle according to claim 12, wherein an upper portion of the electrical component box supports a front portion of a seat where an occupant sits.

20. The saddle-ride type electric vehicle according to claim 13, wherein an upper portion of the electrical component box supports a front portion of a seat where an occupant sits.

* * * * *